Figure 1:
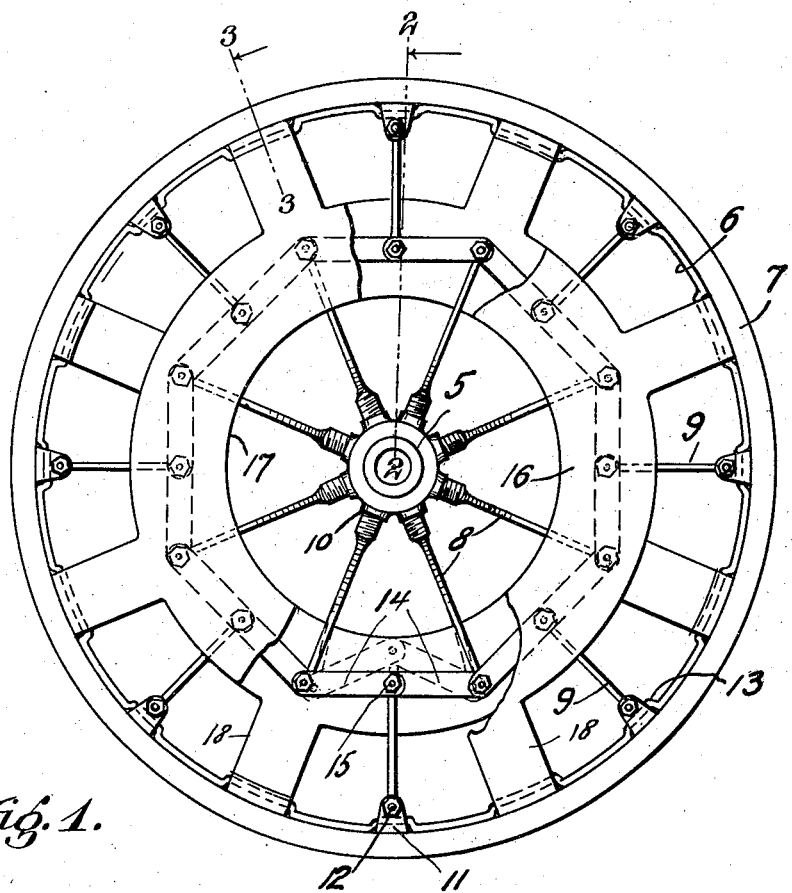

W. W. & C. G. McCLAY.
SPRING WHEEL.
APPLICATION FILED JULY 16, 1917.

1,242,459.

Patented Oct. 9, 1917.

William W. McClay
Clarence G. McClay
INVENTORS.

BY [signature]

ATTORNEYS.

UNITED STATES PATENT OFFICE.

WILLIAM W. McCLAY AND CLARENCE GILBERT McCLAY, OF CHICAGO, ILLINOIS.

SPRING-WHEEL.

1,242,459.    Specification of Letters Patent.    Patented Oct. 9, 1917.

Application filed July 16, 1917. Serial No. 180,864.

*To all whom it may concern:*

Be it known that we, WILLIAM W. McCLAY and CLARENCE G. McCLAY, citizens of the United States, residing at Chicago, in the county of Cook and State of Illinois, have invented new and useful Improvements in Spring-Wheels, of which the following is a specification.

This invention relates to spring wheels in which resiliency is obtained by spring spokes, and the object of the invention is to provide a wheel of this kind having maximum strength and resiliency.

The object stated is attained by means of a novel combination and arrangement of parts to be hereinafter described and claimed, and in order that the same may be better understood, reference is had to the accompanying drawing forming a part of this specification.

Figure 2:
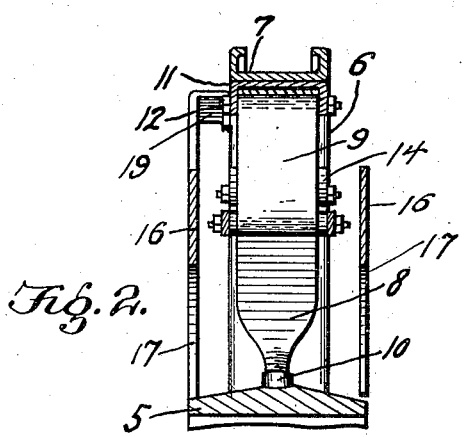
Figure 3:
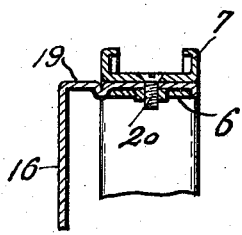

In the drawing,

Figure 1 is an elevation of a wheel constructed in accordance with the present invention, with certain parts broken away, and Figs. 2 and 3 are sections on the lines 2—2 and 3—3, respectively, of Fig. 1.

Referring specifically to the drawing, 5 denotes the hub of the wheel, and 6 a felly carrying a tire-supporting rim 7, which latter is channeled and may be shrunk or otherwise fixed on the felly. Between the hub and the felly extend two sets of spokes, one set being connected to the hub, and the other set to the felly. The spokes of the first-mentioned set are denoted by the reference character 8, and those of the second-mentioned set by the reference character 9. There are eight spokes in each set, but the number of spokes may be varied as desired according to the size of the wheel and the character of the vehicle on which the wheel is to be used, as well as the amount of resiliency desired.

The hub 5 has screw sockets 10 for attachment of the inner ends of the spokes 8. These spokes are resilient, they being flat so that they may flex sidewise.

The felly 6 carries yokes 11 to which the outer ends of the spokes 9 are pivotally connected by cross bolts 12. The felly is formed with depressions 13 so that the yokes may be flush with the periphery, and the sides or edges of the felly are notched or recessed to form seats for the sides of the yokes. The spokes 9 are rigid.

A flexible connection is provided between the sets of spokes 8 and 9, this connection being a circular series of links 14 pivotally connected to form an endless chain located between the two sets of spokes, the connection of the spokes with the links is made at the joints 15 between the latter. The spokes 8 and 9 are connected to the links 14 in alternate order as shown in Fig. 1. Thus, each one of the outer spokes 9 is connected to a pair of links, and each inner spoke 8 is connected to the pair of links which extend between two adjacent spokes 9, the connection being made at the joint 15 between said links. Inasmuch as the spokes 8 are flexible, it will be seen that when a load is placed on the wheel, the felly 6 assumes an eccentric position relative to the hub 5, with the result that the bottom spoke 9 flexes the two links 14 to which it is connected similar to a toggle, and as these two links are also connected to the two adjacent resilient spokes 8, the latter are drawn together as shown dotted in Fig. 1. Thus, the spokes 8 absorb the shocks and strains placed on the wheel when it is running, and a maximum resiliency is obtained.

In order to provide a positive driving connection for the wheel, there is mounted on each side a circular plate 16 which is free of the hub 5, being provided with a central opening 17 to clear the latter. Each plate, however, is attached to the felly 6, it being provided with radial arms or spokes 18 having laterally extending wings 19 at their outer ends which seat beneath the felly and are bolted or otherwise secured thereto as shown at 20. The means for driving the wheel may be connected to either one of the plates 16.

The plates 16 also serve to maintain the true circular contour of the felly 6, and the drive through the plates relieves the spokes of rotative stress and permits them to perform their exclusive function of absorbing shocks.

With the wheel applied to light vehicles the drive may be taken through the hub, in the usual manner, as the rotative force applied to the spokes 8 would not appreciably detract from their resiliency.

We claim:—

1. A spring wheel comprising a hub, a felly, spokes connecting the hub and the felly, said spokes comprising separate sets, the spokes of one set being resilient and connected at their inner ends to the hub, and the spokes of the other set being rigid and connected at their outer ends to the felly, and an endless series of pivotally connected links to which the spokes of the respective sets are connected in alternate order, the connections being made at the pivot joints of the links.

2. A spring wheel comprising a hub, a felly, spokes connecting the hub and the felly, said spokes comprising separate sets, the spokes of one set being resilient and connected at their inner ends to the hub, and the spokes of the other set being rigid and connected at their outer ends to the felly, and an endless series of pivotally connected links to which the spokes are connected, each rigid spoke being connected to a pair of links at their pivotally connected ends, and a pair of adjacent resilient spokes being connected to the opposite ends of said links.

In testimony whereof we affix our signatures.

WILLIAM W. McCLAY.
CLARENCE GILBERT McCLAY.

Copies of this patent may be obtained for five cents each, by addressing the "Commissioner of Patents, Washington, D. C."